United States Patent
Boog et al.

(10) Patent No.: US 11,933,243 B2
(45) Date of Patent: Mar. 19, 2024

(54) METHOD FOR OPERATING AN INJECTOR ON AN INTERNAL COMBUSTION ENGINE, CONTROL UNIT FOR AN INTERNAL COMBUSTION ENGINE, DESIGNED TO CARRY OUT A METHOD OF THIS TYPE, AND INTERNAL COMBUSTION ENGINE HAVING A CONTROL UNIT OF THIS TYPE

(71) Applicant: Rolls-Royce Solutions GmbH, Friedrichshafen (DE)

(72) Inventors: Manuel Boog, Aulendorf (DE); Andrea Prospero, Langenargen (DE)

(73) Assignee: Rolls-Royce Solutions GmbH, Friedrichshafen (DE)

( * ) Notice: Subject to any disclaimer, the term of this patent is extended or adjusted under 35 U.S.C. 154(b) by 0 days.

(21) Appl. No.: 18/311,515

(22) Filed: May 3, 2023

(65) Prior Publication Data

US 2023/0272758 A1    Aug. 31, 2023

Related U.S. Application Data

(63) Continuation of application No. PCT/EP2021/080404, filed on Nov. 2, 2021.

(30) Foreign Application Priority Data

Nov. 6, 2020 (DE) ............ 10 2020 214 001.4

(51) Int. Cl.
*F02D 41/22* (2006.01)
*G07C 5/08* (2006.01)

(52) U.S. Cl.
CPC ........ *F02D 41/221* (2013.01); *G07C 5/0808* (2013.01); *F02D 2041/224* (2013.01); *F02D 2200/0602* (2013.01)

(58) Field of Classification Search
CPC ............ F02D 41/221; F02D 2041/224; F02D 2200/0602; G07C 5/0808
See application file for complete search history.

(56) References Cited

U.S. PATENT DOCUMENTS

| 11,067,024 B2 | 7/2021 | Madan et al. |
| 2019/0128204 A1* | 5/2019 | Leblon ............. F02D 41/221 |

(Continued)

FOREIGN PATENT DOCUMENTS

| DE | 10 2008 040 222 A1 | 1/2010 |
| DE | 102017004424 B4 * | 7/2020 ........... F02D 41/221 |

(Continued)

OTHER PUBLICATIONS

"Euler number (physics)—Wikipedia" Nov. 3, 2020, pp. 1-2, retrieved from the Internet: https://en.wikipedia.org/w/index.php?title=Euler_number_(physics)&oldid=986935221, retrieved on Jan. 28, 2022 (2 pages).

(Continued)

*Primary Examiner* — Syed O Hasan
(74) *Attorney, Agent, or Firm* — Taylor IP, P.C.

(57) ABSTRACT

A method for operating an injector on an internal combustion engine includes the steps of: introducing a fuel into a combustion chamber of the internal combustion engine by way of the injector; capturing, for a plurality of injection events, a wear value for the injector; assigning each respective one of the wear value that is captured to a respective one of a plurality of wear value classes; determining, for each of the plurality of wear value classes, a class frequency of a plurality of the wear value that are captured and assigned to a corresponding one of the plurality of wear value classes; calculating, based on a plurality of class frequencies of the (Continued)

plurality of wear value classes, a total wear value for the injector; and evaluating a condition of the injector based on the total wear value.

14 Claims, 2 Drawing Sheets

(56) References Cited

U.S. PATENT DOCUMENTS

2020/0232411 A1* 7/2020 Pursifull ............ F02M 63/0225
2022/0268233 A1* 8/2022 Kennedy .............. G07C 5/0808

FOREIGN PATENT DOCUMENTS

| DE | 10 2019 001 677 A1 | 9/2020 | |
|----|----|----|----|
| EP | 3 121 425 A1 | 1/2017 | |
| EP | 3121425 A1 * | 1/2017 | ......... F02D 19/0623 |

OTHER PUBLICATIONS

International Search Report and Written Opinion dated Feb. 8, 2022 for International Application No. PCT/EP2021/080404 (15 pages).

* cited by examiner

METHOD FOR OPERATING AN INJECTOR ON AN INTERNAL COMBUSTION ENGINE, CONTROL UNIT FOR AN INTERNAL COMBUSTION ENGINE, DESIGNED TO CARRY OUT A METHOD OF THIS TYPE, AND INTERNAL COMBUSTION ENGINE HAVING A CONTROL UNIT OF THIS TYPE

CROSS REFERENCE TO RELATED APPLICATIONS

This is a continuation of PCT application no. PCT/EP2021/080404, entitled "METHOD FOR OPERATING AN INJECTOR ON AN INTERNAL COMBUSTION ENGINE, CONTROL UNIT FOR AN INTERNAL COMBUSTION ENGINE, DESIGNED TO CARRY OUT A METHOD OF THIS TYPE, AND INTERNAL COMBUSTION ENGINE HAVING A CONTROL UNIT OF THIS TYPE", filed Nov. 2, 2021, which is incorporated herein by reference. PCT application No. PCT/EP2021/080404 claims priority to German patent application no. DE 10 2020 214 001.4, filed Nov. 6, 2020, which is incorporated herein by reference.

BACKGROUND OF THE INVENTION

1. Field of the Invention

The present invention relates to a method for operating an injector on an internal combustion engine, a control unit for an internal combustion engine, and an internal combustion engine designed to carry out said method.

2. Description of the Related Art

With a method of this type, or more specifically with an internal combustion engine of this type, fuel is introduced into the combustion chamber by way of an injector. However, the problem is that such an injector can experience wear due to the introduction, in particular injection, of fuel. Noticeably, the service life of such an injector is limited due to cavitation wear of an injection nozzle, wherein material abrasion and/or erosion effects occur gradually at a nozzle pocket cavity and at a transition into spray holes, as well as in the spray holes, which influence a spray pattern of the injector as well as the flow through the injector. Damage patterns can also occur on a pilot valve of the injector, which also depend on a switching number and pressure conditions on the injector. Damage can therefore also occur in particular to actuator components inside the injector. If cavitation damage in the area of the injection nozzle is advanced, cracks may even form and a nozzle tip may spontaneously break off. In turn, damages to the injector cause uncontrolled introduction of fuel into the combustion chamber. In order to reliably eliminate damages and problems of this type, relatively short firmly established maintenance intervals have been provided for injectors hitherto. Experience has shown in particular that such an injector clearly can often be operated without problems over a longer period of time than the stipulated maintenance interval. Premature replacement of the injectors is therefore uneconomical and usually unnecessary. On the other hand it is not possible to simply extend the replacement interval since this would entail considerable risks for the operation of the internal combustion engine. An injector-specific sensor system for monitoring the functionality of the injectors is very expensive and complicated.

What is needed in the art is a method for operating an injector on an internal combustion engine, a control unit for an internal combustion engine and an internal combustion engine wherein the aforementioned disadvantages do not occur.

SUMMARY OF THE INVENTION

The present invention provides a method for operating an injector on an internal combustion engine, wherein fuel is introduced into a combustion chamber of the internal combustion engine by way of the injector, wherein for each of a plurality of injection events a wear value for the injector is captured. Each captured wear value is assigned to a wear value class of a plurality of wear value classes. For each wear value class of the plurality of wear value classes, a class frequency of those captured wear values that are assigned to the wear value class is determined. Based on the class frequencies of the wear value classes, a total wear value for the injector is calculated, and a condition of the injector is evaluated based on the total wear value. Thus, an evaluation of the condition of the injector can be conducted in a simple and cost-effective manner—without sensor technology—so that it can be determined whether use of the injector can be continued or whether it needs to be replaced. The service life of the injector can be selected variably, depending on the determined condition of the injector, so that the life cycle costs of the injector can be reduced. The process can be retrofitted to an existing internal combustion engine in a simple manner, in particular by loading an appropriate computer program product. This does not require any hardware components which are not already present on an internal combustion engine.

In particular, a wear value for the injector is captured for each injection event of the plurality of injection events. It is thereby possible that a wear value is captured for each injection event of the injector. However, it is also possible that a wear value is only captured for a selected majority of the injection events, in other words for a sub-number of injection events.

A fuel introduction event is understood to mean in particular a jet injection or a spray injection of fuel by way of the injector into the combustion chamber. In particular, such a fuel introduction event may be a main injection, a pre-injection, and/or a post-injection.

The fact that the fuel is introduced into the combustion chamber means in particular that the fuel is injected indirectly or directly into the combustion chamber. In particular, the injector can discharge directly into the combustion chamber. It is however also possible for the injector to introduce fuel into a charging path or air path of the internal combustion engine, upstream of the combustion chamber, in particular upstream of an intake valve. The fuel can thus be introduced in particular as a single-point injection, as a multi-point injection, or also as a direct injection. In particular, the introduction of the fuel is an injection when the fuel is liquid, especially when the fuel is liquid under normal conditions, that is, at 1013 mbar and 25° C. The injector can be designed in particular as a liquid fuel injector, in particular a diesel injector. It is however also possible that the introduction of fuel is an injection of combustible gas.

That each captured wear value of a wear value class is assigned to a plurality of wear value classes means in particular, that the captured wear values are histogrammed. The wear value classes are optionally established in particular by assigning a wear value scale to optionally directly adjacent wear value ranges, whereby these wear value ranges establish the wear value classes. The fact that a captured wear value is assigned to a wear value class then means that a class numerator of the particular wear value class in which the wear value falls counts up, in other words is incremented. Thus, a frequency distribution of the captured wear values is ultimately determined over the wear value classes, and the injector condition can be evaluated in particular on the basis of this frequency distribution.

According to an optional embodiment, the wear value scale is subdivided into a plurality of wear value classes with the same class breadth. However, according to another embodiment, it is also possible for the wear value scale to be divided into a plurality of wear value classes with different class breadths.

The assignment of the wear values to the wear value classes occurs optionally moreover depending on at least one additional parameter, in particular depending on a fuel pressure at the injector or subject to a difference between the fuel pressure and a back pressure against which the fuel is dispensed. The fuel pressure and the back pressure can also be used as additional parameters for the assignment to the wear value classes. As the at least one additional parameter, an injection duration may additionally or alternatively be used, or at least information regarding whether the injector is operated in a ballistic range or in a linear range in a single injection event. A ballistic range is hereby understood to be an operating mode of the injector wherein an injector needle does not reach its final position in an open position prior to closing again. Alternatively or additionally, the at least one additional parameter can also be information about the type of fuel introduction event to which the wear value under consideration is assigned, in particular whether the fuel introduction event is a main injection, a post-injection, in particular a first post-injection or a second post-injection, or a pre-injection.

In this way, multidimensional histogramming is optionally performed; this means in particular that a multidimensional histogram of the wear values is generated. Alternatively or additionally it is however also possible that a weighting of the wear values is performed, subject to the at least one additional parameter. This weighting can, for example, result in an intrinsically lower wear value being assigned to a higher wear value class due to the additional parameter assigned to it—or vice versa.

Thus, for each wear value class of the plurality of wear value classes, a class frequency of the wear values which are assigned to the wear value class is now determined. The total wear value is then calculated from the class frequencies of the wear value classes.

The injector condition is in particular an extent of damage and/or wear to the injector. The fact that the injector condition is evaluated means in particular that a determination is made as to whether the injector can continue to be used or whether it needs to be replaced. The injector condition is however optionally used to determine the extent of degradation and/or in which way the injector is damaged and/or worn.

In particular, the total wear value for the injector is calculated from the class frequencies of the wear value classes.

The method is optionally carried out continuously during operation of the internal combustion engine.

It is possible that the total wear value is always recalculated or updated after a certain number of injection events. It is also possible that the total wear value is recalculated or updated after a certain number of operating hours. It is equally possible that the evaluation of the injector condition is not carried out continuously, but rather in a time and/or event dependent manner, in particular after every injection event, after a predetermined number of injection events, or after a certain number of operating hours.

The method is optionally carried out separately for each injector of a plurality of injectors of the internal combustion engine. An international combustion engine typically has a plurality of injectors, wherein the herein described method can easily be implemented separately for each injector of the plurality of injectors. In particular, the process is optionally restarted for an injector after it has been replaced—possibly prematurely.

The method is optionally only carried out during a stationary operating state of the internal combustion engine. Otherwise it is optional to wait until a stationary operating state occurs. Only then is the method continued. Meaningful wear values for the injector can be obtained especially at stationary operating points.

However, according to an optional embodiment, it is also possible that the method is carried out independently of whether the internal combustion engine is currently being operated in a stationary or in a transient operating state.

In particular, the method can be carried out meaningfully also in transient operating states.

According to an optional embodiment, maximum damage to the injector is assumed for a—chronologically interrelated—transient operating condition. This means in particular that a maximum wear value is captured for each injection event of the injector within the transient operating state or that the respective injection event is assigned to a maximum wear value class. This approach facilitates an especially simple way of capturing transient operating conditions.

According to a further development of the invention, it is provided that as a wear value a cavitation number is captured which is characteristic of a cavitation occurring at the injector during an injection event. Since cavitation represents a main wear mechanism of the injector, it is advantageous to quantify it and to be able to evaluate the injector condition based on the quantified cavitation, that is the cavitation number.

According to a further development of the invention it is provided that the cavitation number is determined on the basis of the pressure conditions at the injector. In the process it was found that the pressure conditions at the injector are significant for the occurrence of cavitation and thus also for the wear of the injector. In particular, the cavitation number is optionally determined based on the fuel pressure at the injector, especially as a function of the fuel pressure at the injector.

The cavitation number is optionally determined as a quotient, with the numerator of the quotient containing a difference between the fuel pressure at the injector and the back pressure, wherein the denominator of the quotient contains the back pressure. In particular, the cavitation number is optionally calculated as a quotient.

The fuel pressure is in particular the pressure at which the fuel is applied to the injector and expelled from the injector. In particular, a high-pressure accumulator pressure in a common high-pressure accumulator for a plurality of injectors, in particular in a so-called rail of a common rail system, which is also referred to as rail pressure, can also be used as fuel pressure. Alternatively or additionally, a single accumulator pressure in a single fuel accumulator which is assigned to the injector can be used as the fuel pressure.

The back pressure is in particular the pressure present in a volume into which the fuel is introduced via the injector. The back pressure can in particular be a combustion chamber pressure if the injector is provided and arranged for direct spray injection or direct jet injection into the combustion chamber.

The fuel pressure is optionally detected, in particular measured, by way of a fuel pressure sensor. The back pressure can be measured with a back pressure sensor, in particular by way of a combustion chamber pressure sensor. It is however also possible that the back pressure, in particular the combination chamber pressure, is read out from a characteristic diagram, in particular depending upon a current operating point of the internal combustion engine. It has been found that this allows the back pressure to be determined with sufficiently high accuracy, so that a measurement is not absolutely necessary. According to another optional embodiment, it is also possible that the back pressure is assumed to be constant, whereby in an optional embodiment a predetermined pressure value, in particular an estimated value, is used for the back pressure. The latter is particularly advantageous when the fuel pressure is much greater than the back pressure.

To calculate the cavitation number, the difference is in particular established first as the numerator of the quotient, wherein the back pressure is subtracted from the fuel pressure at the injector. Subsequently, the back pressure is used as the denominator of the quotient, in other words, the previously calculated difference is divided by the back pressure. The result is then the cavitation number.

The cavitation number is calculated in particular according to the following equation:

$$K = \frac{p_1 - p_2}{p_2} \qquad (1)$$

where in equation (1) $p_1$ is the fuel pressure at the injector, $p_2$ is the back pressure, and K is the cavitation number.

According to a further development of the present invention, it is provided that the total wear value is calculated as the sum of the—optionally weighted—class frequencies over the wear value classes. The injector condition is thus evaluated in particular depending on the number of frequencies with which certain wear values, in particular certain cavitation numbers, have occurred. In particular, this facilitates a plausible estimation of wear, especially cavitation wear.

The weighting, which is optionally performed with respect to the wear value classes, allows a wear relevance to be determined differently for the different wear value classes. It is for example apparent that not every value of the cavitation number represents an equally relevant impairment of or influence on the condition of the injector. It is therefore expedient to weigh the wear value classes according to their relevance.

According to a further development of the invention it is thus provided that the class frequencies for calculation of the total wear value are weighted—in particular in a wear value class related manner—with a class frequency maximum value. Optionally, each wear value class is hereby assigned a predetermined class frequency maximum value, which can be interpreted as a maximum number of wear values which occurred in the respective wear value class, which is still just acceptable for the injector or above which a maintenance measure, for example a replacement of the injector, should be implemented. In particular, the class frequencies are optionally each divided by the class frequency maximum value assigned to them.

The total wear value is optionally calculated in particular according to the following equation:

$$S = \sum_{i=1}^{j} \frac{n_i}{S_i}, \qquad (2)$$

whereby, in equation (2) S represents the total wear value, $n_i$ represents the respective class frequency of wear value class i, and $S_i$ is the respective class frequency maximum value assigned to wear value class i, wherein j denotes the highest wear value class, and wherein, accordingly, the summation progresses over the wear value classes.

According to a further development of the present invention, it is provided that the predetermined class frequency maximum value for each wear value class is read out from a characteristic diagram, optionally dependent on an injection duration, in particular spray injection or jet injection duration. In particular, this signifies the following: A characteristic diagram exists in which the cavitation numbers assigned to the wear value classes, or the wear value classes directly, are plotted against the predetermined maximum class frequency value. For each wear value class, the predetermined class frequency maximum value assigned to it can thus be read out from the characteristic diagram.

Optionally, a different characteristic diagram of this type exists for each of a plurality of different injection durations, wherein one can extrapolate between the characteristic diagram entries if the injection duration does not correspond exactly to an injection duration for which a characteristic diagram entry is stored. The corresponding characteristic diagram can in particular be in the form of a Wöhler curve. In particular, low predetermined class frequency maximum values are optionally assigned to high cavitation numbers, wherein high predetermined class frequency maximum values are assigned to low cavitation numbers.

In a simplified optional embodiment, different characteristic diagrams may exist, depending on a parameter, in particular a binary parameter, which indicates whether the injector is operated in the ballistic or linear range.

According to a further development of the invention it is provided that the condition of the injector is evaluated in that the total wear value is compared with a predetermined maximum total wear value. In particular, the total wear value defined above according to equation (2) increases over the course of the service life of the internal combustion engine or respectively the injector. The condition of the injector can thus be advantageously evaluated in that it is verified as to how closely the total wear value has approached the predetermined total wear value maximum value. According to an optional embodiment, it is possible for the total wear value maximum value to be equal to one.

According to a further development of the present invention, it is provided that a remaining service life for the injector is determined on the basis of the total wear value, in particular on the basis of the comparison of the total wear value with the total wear value maximum value. This enables a prognosis to be made in regard to further possible service time of the injector until maintenance, in particular in regard to replacement of the injector. This occurs optionally under consideration of a—in particular previous, that is historical—load profile and/or a rotational speed of the internal combustion engine, wherein it is optionally assumed that the future load profile of the internal combustion engine will be at least similar to the past load profile. Thus, an extrapolation for the further development is carried out in particular from the past development of the total wear value, in particular in the direction of the total wear value maximum value, and in particular with regard to the question as to when the total wear value maximum value is reached by the total wear value. This then provides an indication of the remaining service life of the injector.

According to a further development of the present invention, it is provided that different injection events within an operating cycle of the internal combustion engine are separately assigned to different wear value classes. In particular, the assignment of the wear values to the wear value classes can be designed differently for the different injection events. Different histograms are thus generated in particular for the different injection events. Different injection events within an operating cycle are understood to mean, in particular, events such as a pre-injection, a main injection, a post-injection, in particular a first post-injection and a second post-injection. Different conditions typically exist at the injector for these different injection events, so that it is advantageous to treat the injection events separately and to histogram them separately with respect to different wear value classes.

According to a further development of the present invention, it is provided that for the calculation of the total wear value all different injection events within an operating cycle are considered together. The summation includes in particular that a total sum over all wear value classes of all injection events is provided. Consequently, a particularly simple and easy-to-calculate evaluation of the injector condition can be performed.

The present invention also provides a control unit for an internal combustion engine which is designed: to respectively detect a wear value for an injector for a plurality of injection events; to assign each detected wear value to a wear value class of a plurality of wear value classes; to determine a class frequency of the detected wear values assigned to the wear value class for each wear value class of the plurality of wear value classes; and to calculate a total wear value for the injector on the basis of the class frequencies of the wear value classes. The control unit is moreover designed to calculate the condition of the injector on the basis of the total wear value. In the context of the control unit, advantages arise in particular which were already discussed in the context of the method.

The control unit is designed in particular to perform a method according to the invention or a method according to one of the previously described embodiments.

The present invention also provides an internal combustion engine which includes at least one combustion chamber and at least one injector which is designed to introduce fuel into the at least one combustion chamber of the internal combustion engine. The internal combustion engine includes an inventive control unit or a control unit according to one of the previously described design examples.

In the context of the internal combustion engine, advantages arise in particular which were already discussed in the context of the method and the control unit.

The internal combustion engine optionally has a fuel pressure sensor which is designed to detect a fuel pressure present directly at the injector, in particular at the injector, or a fuel pressure associated with the fuel present at the injector, for example a fuel pressure in a common rail of a common-rail system, or a pressure in an individual accumulator of the injector. The fuel pressure sensor is optionally operatively connected with the control unit so that the detected fuel pressure can be received by the control unit.

According to an optional embodiment, it is possible that the internal combustion engine includes a back pressure sensor that is designed to detect a back pressure, in particular combustion chamber pressure for a volume into which the fuel is introduced via the injector. This back-pressure sensor can in particular be a combustion chamber pressure sensor. The back pressure sensor is optionally operatively connected with the control unit so that the detected back pressure can be received by the control unit.

Alternatively, it is also possible that the control unit is designed to read or calculate the back pressure from a characteristic diagram—in particular depending on the operating point—or to use a predetermined, constant value for the back pressure.

The control unit is optionally designed to detect, in particular to calculate—as a wear value—a cavitation number which is characteristic of cavitation occurring at the injector during an injection event, wherein the cavitation number is optionally determined, in particular calculated, on the basis of the pressure conditions at the injector, optionally depending on the fuel pressure at the injector, in particular as a quotient of a difference between the fuel pressure and the back pressure divided by the back pressure.

The control unit is optionally arranged to issue a message or warning indicating the injector condition, in particular a maintenance or replacement recommendation, depending on the injector status. Alternatively or additionally, the control unit is optionally arranged to determine a remaining service life for the injector, and optionally to issue the remaining service life.

The control unit is optionally arranged in particular to calculate the total wear value in the sense of the method explained above and to compare it with the predetermined total wear value maximum value, and optionally to issue a replacement or maintenance recommendation if the total wear value is greater than or equal to the total wear value maximum value.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate at least one embodiment of the invention, and such exemplifications are not to be construed as limiting the scope of the invention in any manner.

DETAILED DESCRIPTION OF THE INVENTION

Figure 1:
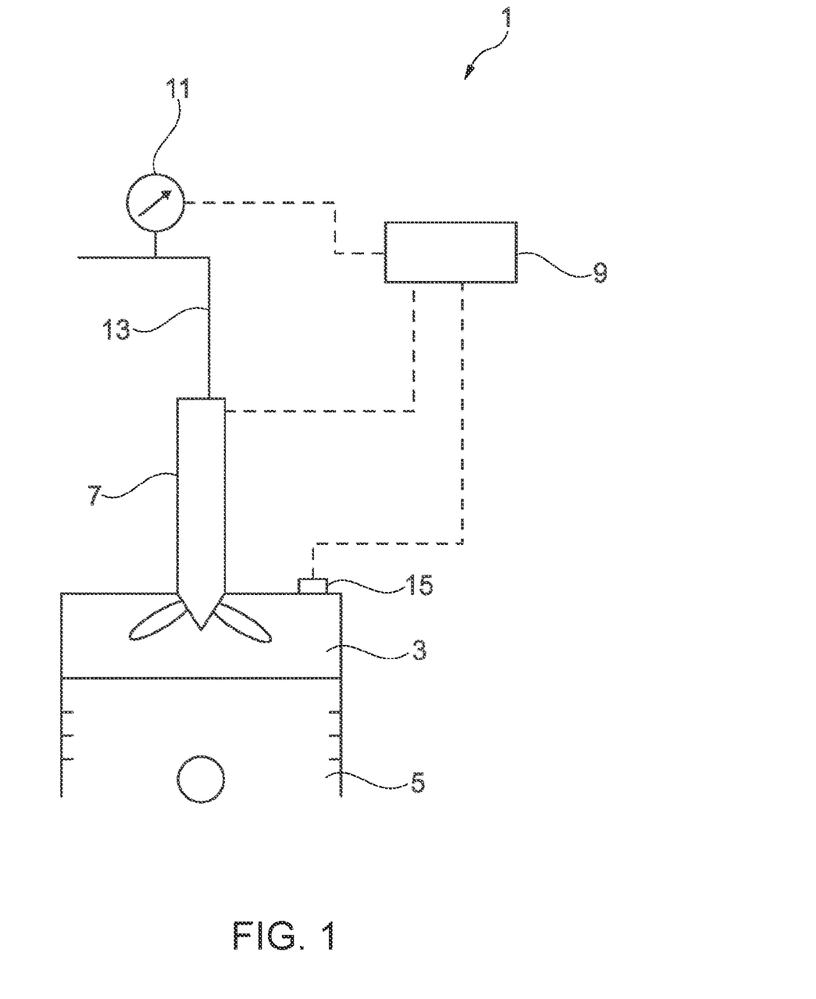
FIG. 1 is a schematic illustration of one design example of an internal combustion engine, and of a design example of a control unit for the internal combustion engine.

FIG. 1 is a schematic illustration of an internal combustion engine 1, having at least one combustion chamber 3, in which a piston 5 can be displaced in a stroke. Thus, internal combustion engine 1 is designed as a reciprocating piston engine in the design example shown. Internal combustion engine 1 moreover includes an injector 7 which is designed and arranged to introduce fuel into combustion chamber 3 of internal combustion engine 1. In the herein illustrated design example, injector 7 is designed to directly spray or jet inject fuel into chamber 3 by way of direct jet or spray injection.

Internal combustion engine 1 also has a control unit 9 which, in order to always detect a wear value for injector 7 for each injection event of a plurality of injection events—wherein fuel is being introduced into combustion chamber 3 by injector 7 during such an injection event—is designed to assign each detected wear value to a wear value class of a plurality of wear value classes, and to determine for each wear value class of the plurality of wear value classes a class frequency of the wear values which are respectively assigned to the wear value class. Control unit 9 is further arranged to calculate a total wear value for injector 7 based on the class frequencies of the wear value classes, and to evaluate an injector condition of injector 7 based on the overall wear value. In this way, it is possible to establish an individual maintenance interval for injector 7, and in particular not to have to replace it unnecessarily after a mandated, rigid period of time. However, there is no need to resort to expensive and complex injector-specific sensor technology.

If internal combustion engine 1 has a plurality of such injectors 7, the procedure is carried out separately for each injector 7. This results in variable time spans of service lives for the various injectors 7 and thus a reduction in average life cycle costs. Internal combustion engine 1 optionally has a plurality of combustion chambers 3 of optionally identical design, wherein a separate injector 7 is especially optionally assigned to each of the combustion chambers 3.

In particular, control unit 9 is operatively connected with injector 7 for activation of the latter.

Control unit 9 is optionally designed to determine a fuel pressure of fuel that is present at injector 7. For this purpose, unit 9 is operatively connected to a fuel pressure sensor 11. In the illustrated design example the latter is arranged to detect a fuel pressure in a fuel supply line 13 to injector 7. Alternatively, it is possible that fuel pressure sensor 11 is arranged to detect a high pressure in a common high pressure rail for a plurality of injectors 7, in particular in a so-called common rail, wherein such a fuel pressure is also referred to as rail pressure. In a further alternative it is possible that fuel pressure sensor 11 is arranged to detect a fuel pressure in an individual accumulator of injector 7.

Control unit 9 is also optionally arranged to determine a back pressure against which fuel is introduced by injector 7 during an injection event into a volume in which the back pressure exists. In the design example shown here, control unit 9 is operatively connected for this purpose to a combustion chamber pressure sensor 15, which detects the combustion chamber pressure in combustion chamber 3 as back pressure. Alternatively, it is in particular also possible that control unit 9 is arranged to determine or calculate the back pressure, in particular the combustion chamber pressure, on the basis of at least one other parameter from a characteristic diagram, in particular depending on a current operating state of internal combustion engine 1, or to use a predetermined, constant value for the back pressure.

Control unit 9 is arranged in particular to carry out a method for operating injector 7 on internal combustion engine 1, which is explained in more detail below.

Within the scope of the method, a wear value for injector 7 is detected respectively for a plurality of injection events, wherein each detected wear value is assigned to a wear value class of a plurality of wear value classes; wherein a class frequency of the detected wear values assigned to the wear value class is determined for each wear value class of the plurality of wear value classes; wherein a total wear value for injector 7 is calculated on the basis of the class frequencies of the wear value classes; and wherein an injector condition of injector 7 is evaluated on the basis of the total wear value.

A cavitation number that is characteristic of a cavitation occurring at injector 7 during an injection event is thereby optionally captured as a wear value.

The cavitation number is optionally determined on the basis of pressure conditions at injector 7, in particular as the quotient of a difference between the fuel pressure at injector 7 and the back pressure, divided by the back pressure, in particular in accordance with equation (1) previously shown.

The total wear value is optionally calculated as the sum of the optionally weighted class frequencies over the wear value classes. Optionally, the class frequencies for calculating the total wear value are weighted with a predetermined class frequency maximum value. The calculation of the total wear value occurs optionally according to the previously shown equation (2).

The predetermined class frequency maximum value is optionally read for each wear value class from a characteristic diagram, in particular subject to an injection duration.

The condition of the injector is optionally evaluated in that the total wear value is compared with a total wear value maximum value.

Remaining service life for injector 7 is optionally determined on the basis of the total wear value, in particular on the basis of the comparison of the total wear value with the total wear value maximum value, optionally by taking into account a load profile and/or a rotational speed of internal combustion engine 1.

Different injection events within an operating cycle of internal combustion engine 1 are optionally assigned separately to different wear value classes.

Optionally, all different injection events within an operating cycle are considered together for the calculation of the total wear value.

Figure 2:
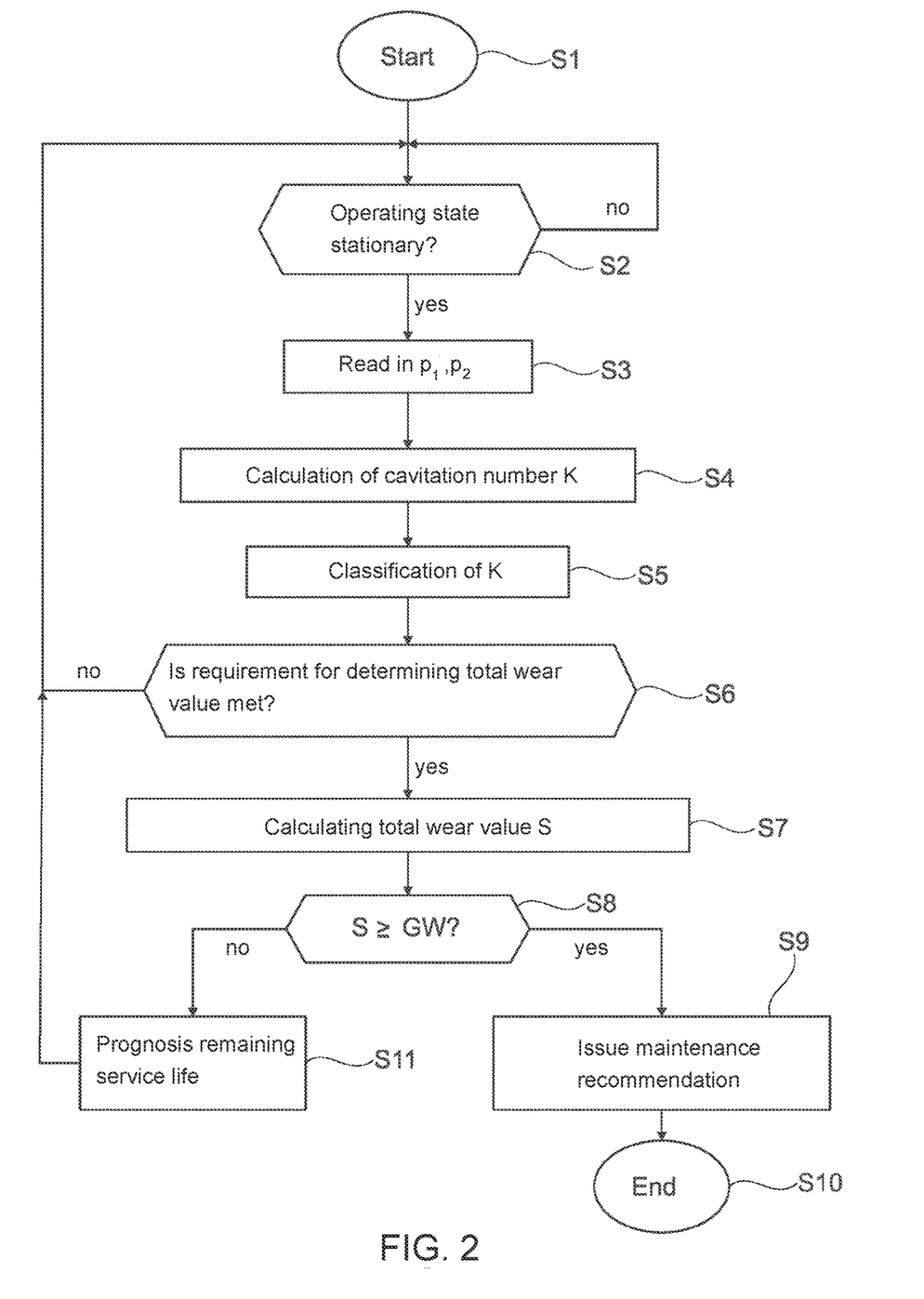
FIG. 2 is a schematic illustration in the form of a flow chart, of one design example of a method for operating an injector on an internal combustion engine, in particular the internal combustion engine according to FIG. 1.

FIG. 2 is a schematic illustration in the form of a flow chart, of one embodiment of the method.

The method begins in a first step S1 during operation of internal combustion engine 1. In a second step S2, an optional check is conducted as to whether a stationary operating state of internal combustion engine 1 is currently present. If this is not the case, second step S2 is optionally repeated in a loop until a stationary operating state exists. If this is the case, the process is continued in a third step S3. However, it is also possible to carry out the method in such a way that transient operating states are also considered or that it is completely disregarded as to whether the internal combustion engine is currently being operated in a stationary operating state or in a transient operating state.

In third step S3, fuel pressure $p_1$ and back pressure $p_2$ are determined, in particular captured, read in or read from a characteristic diagram, or—in the case of back pressure $p_2$—are assumed to be a predetermined, constant value.

In a fourth step S4, the wear value is calculated—in particular as cavitation number—from fuel pressure $p_1$ and back pressure $p_2$, in particular according to equation (1).

In a fifth step S5, the wear value is classified; in other words it is assigned to a wear value class of a plurality of wear value classes. In particular, the cavitation numbers are histogrammed from a plurality of passes of the process, which is optionally repeated continuously.

In a sixth step S6, a check is conducted as to whether at least one requirement for determination of a total wear value is fulfilled, the requirement optionally being an expiration of a predetermined time since a last calculation of the total wear value, in particular a predetermined number of operating hours, or a specific number of injection events carried out after the last calculation of the total wear value, or the occurrence of another event.

If the requirement is fulfilled, the procedure is continued in a seventh step S7, otherwise the procedure reverts back to before second step S2 and is thus continued with second step S2. In this design example of the method, the total wear value is therefore not calculated after each run through steps S3 to S5. However, it is also possible that sixth step S6 is omitted or that the requirement is adapted accordingly so that the total wear value is calculated after each run-through of steps S3 to S5. The requirement in step S6 can save time on the one hand and ensures on the other hand that sufficiently meaningful statistics are provided for histogramming the cavitation counts.

In seventh step S7, the total wear value is calculated on the basis of the class frequencies of the wear value classes, in particular according to equation (2), namely as the sum of the optionally weighted class frequencies over the wear value classes, these being weighted in particular with a predetermined class frequency maximum value assigned respectively to them.

In an eighth step S8 the condition of the injector is then evaluated, in that the total wear value is compared with the predetermined total wear value maximum value GW.

If it is thereby determined in step S8 that the total wear value is greater than or equal to the total wear value maximum value, a maintenance recommendation—in particular a recommendation to replace injector 7—is issued in step S9, and the process ends in a tenth step S10.

If, in contrast it is determined in eighth step S8 that the total wear value is not greater than or equal to total wear value maximum value GW, a prognosis in regard to a remaining service life of injector 7 is optionally issued in an eleventh step S11, in particular by considering a previous load profile and/or a rotational speed of internal combustion engine 1. Optionally, the result of the prognosis, in particular namely the remaining service life, is issued. The process is then continued with second step S2.

In particular, the method is optionally continued, in particular iterated, during the operation of internal combustion engine 1 until either the operation of internal combustion engine 1 is terminated, or until a maintenance recommendation for injector 7 is generated in ninth step S9.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for operating an injector on an internal combustion engine, the method comprising the steps of:
   introducing a fuel into a combustion chamber of the internal combustion engine by way of the injector;
   capturing, for a plurality of injection events, a wear value for the injector;
   assigning each respective one of the wear value that is captured to a respective one of a plurality of wear value classes;
   determining, for each of the plurality of wear value classes, a class frequency of a plurality of the wear value that are captured and assigned to a corresponding one of the plurality of wear value classes;
   calculating, based on a plurality of class frequencies of the plurality of wear value classes, a total wear value for the injector; and
   evaluating a condition of the injector based on the total wear value, as a respective one of the wear value a cavitation number being captured which is characteristic of a cavitation occurring at the injector during a respective one of the plurality of injection events, the cavitation number being determined based on a plurality of pressure conditions at the injector, depending on a fuel pressure at the injector, as a quotient of a difference between the fuel pressure at the injector and a back pressure divided by the back pressure.

2. The method according to claim 1, wherein the cavitation number is determined based on a plurality of pressure conditions at the injector.

3. The method according to claim 1, wherein the total wear value is calculated as a sum of the plurality of class frequencies over the plurality of wear value classes.

4. The method according to claim 1, wherein the total wear value is calculated as a sum of weighted ones of the plurality of class frequencies over the plurality of wear value classes.

5. The method according to claim 1, wherein the plurality of class frequencies for calculating the total wear value are weighted with a predetermined class frequency maximum value.

6. The method according to claim 5, wherein the predetermined class frequency maximum value for each of the plurality of wear value classes is read out from a characteristic diagram.

7. The method according to claim 5, wherein the predetermined class frequency maximum value for each of the plurality of wear value classes is read out from a characteristic diagram dependent on an injection duration.

8. The method according to claim 1, wherein the condition of the injector is evaluated in that the total wear value is compared with a predetermined total wear value maximum value.

9. The method according to claim 1, wherein a remaining service life for the injector is determined based on the total wear value.

10. The method according to claim 1, wherein a remaining service life for the injector is determined based on a comparison of the total wear value with a total wear value maximum value, by taking into account at least one of a load profile and a rotational speed of the internal combustion engine.

11. The method according to claim 1, wherein different ones of the plurality of injection events within an operating cycle of the internal combustion engine are separately assigned to different ones of the plurality of wear value classes.

12. The method according to claim 1, wherein for calculating the total wear value all different ones of the plurality of injection events within an operating cycle of the internal combustion engine are considered together.

13. A control unit for an internal combustion engine, the control unit comprising:
   the control unit which is configured for:

capturing respectively a wear value for an injector for a plurality of fuel introduction events into a combustion chamber of the internal combustion engine;

assigning each respective one of the wear value that is captured to a respective one of a plurality of wear value classes;

determining, for each of the plurality of wear value classes, a class frequency of a plurality of the wear value that are detected and assigned to a corresponding one of the plurality of wear value classes;

calculating, based on a plurality of class frequencies of the plurality of wear value classes, a total wear value for the injector; and evaluating a condition of the injector based on the total wear value, as a respective one of the wear value a cavitation number being captured which is characteristic of a cavitation occurring at the injector during a respective one of the plurality of injection events, the cavitation number being determined based on a plurality of pressure conditions at the injector, depending on a fuel pressure at the injector, as a quotient of a difference between the fuel pressure at the injector and a back pressure divided by the back pressure.

14. An internal combustion engine, comprising:

at least one combustion chamber;

at least one injector which is configured for introducing a fuel into the at least one combustion chamber; and a control unit, which is configured for:

capturing respectively a wear value for the at least one injector for a plurality of fuel introduction events into the at least one combustion chamber of the internal combustion engine;

assigning each respective one of the wear value that is captured to a respective one of a plurality of wear value classes;

determining, for each of the plurality of wear value classes, a class frequency of a plurality of the wear value that are detected and assigned to a corresponding one of the plurality of wear value classes;

calculating, based on a plurality of class frequencies of the plurality of wear value classes, a total wear value for the injector; and evaluating a condition of the at least one injector based on the total wear value, as a respective one of the wear value a cavitation number being captured which is characteristic of a cavitation occurring at the injector during a respective one of the plurality of injection events, the cavitation number being determined based on a plurality of pressure conditions at the injector, depending on a fuel pressure at the injector, as a quotient of a difference between the fuel pressure at the injector and a back pressure divided by the back pressure.

* * * * *